US012647344B2

(12) United States Patent
Jain et al.

(10) Patent No.: US 12,647,344 B2
(45) Date of Patent: Jun. 2, 2026

(54) NETWORK SEGMENTATION IN MULTI-SITE COMPUTER NETWORKS

(71) Applicant: Cisco Technology, Inc., San Jose, CA (US)

(72) Inventors: Prakash C. Jain, Fremont, CA (US); Sanjay Kumar Hooda, Pleasanton, CA (US); Kedar Sudhir Karmarkar, San Jose, CA (US); Aaditya Nitin Vadnere, Indore (IN)

(73) Assignee: Cisco Technology, Inc., San Jose, CA (US)

( * ) Notice: Subject to any disclaimer, the term of this patent is extended or adjusted under 35 U.S.C. 154(b) by 51 days.

(21) Appl. No.: 18/795,005

(22) Filed: Aug. 5, 2024

(65) Prior Publication Data

US 2026/0039579 A1 Feb. 5, 2026

(51) Int. Cl.
| | |
|---|---|
| *H04L 45/02* | (2022.01) |
| *H04L 12/46* | (2006.01) |
| *H04L 45/00* | (2022.01) |

(52) U.S. Cl.
CPC ............ *H04L 45/04* (2013.01); *H04L 12/465* (2013.01); *H04L 45/34* (2013.01)

(58) Field of Classification Search
CPC ........ H04L 45/04; H04L 12/465; H04L 45/34
See application file for complete search history.

(56) References Cited

U.S. PATENT DOCUMENTS

| | | | | |
|---|---|---|---|---|
| 10,693,733 | B2 * | 6/2020 | Hooda | .................... H04L 49/70 |
| 11,082,259 | B1 | 8/2021 | Devaraj et al. | |

| | | | | |
|---|---|---|---|---|
| 11,165,702 | B1 * | 11/2021 | Jain | .......................... H04L 45/64 |
| 11,277,282 | B2 * | 3/2022 | Oswal | ................. H04L 12/1886 |
| 11,411,911 | B2 * | 8/2022 | Levi | ...................... H04L 61/103 |
| 11,456,955 | B2 * | 9/2022 | Menon | .................. H04L 45/566 |
| 11,463,356 | B2 * | 10/2022 | Forster | ............... H04L 41/0803 |
| 11,888,736 | B2 * | 1/2024 | Jain | ....................... H04L 45/586 |

(Continued)

FOREIGN PATENT DOCUMENTS

WO WO2015123849 A1 8/2015

OTHER PUBLICATIONS

International Search Report and Written Opinion for International Application No. PCT/US2025/028121, mailed Jul. 30, 2025, 16 Pages.

*Primary Examiner* — David R Lazaro
(74) *Attorney, Agent, or Firm* — Lee & Hayes, P.C.

(57) ABSTRACT

This disclosure describes techniques for enabling multiple subnets across multiple fabric sites and associated with multiple network segments (e.g., virtual networks (VNs)) to communicate with each other using a shared network infrastructure, such as a service provider network. In some cases, the techniques described herein include using a common transit VN (e.g., a common transit VN with or without a common firewall) in the shared network infrastructure as well as border devices that enable switching traffic between the common transit VNs and segment VNs (e.g., subscriber VNs) for data transmission to and/or from the common transit VN. In some cases, a border device maintains two types of mapping entries (e.g., map-caches): transit mapping entries and local mapping entries. A transit and a local mapping entry may be configured to represent (e.g., installed to program) forwarding information for packets received on a transit VN and on a segment VN, respectively.

20 Claims, 6 Drawing Sheets

(56)     References Cited

U.S. PATENT DOCUMENTS

| 12,316,539 B2 * | 5/2025 | Moreno | H04L 12/4641 |
| 2017/0005923 A1 | 1/2017 | Babakian | |
| 2020/0162282 A1 | 5/2020 | Ashtaputre et al. | |
| 2021/0112000 A1 * | 4/2021 | Forster | H04L 41/0803 |
| 2021/0226817 A1 * | 7/2021 | Oswal | H04L 12/4679 |
| 2021/0328917 A1 * | 10/2021 | Menon | H04L 45/566 |
| 2023/0017053 A1 * | 1/2023 | Jain | H04L 45/04 |
| 2024/0031333 A1 | 1/2024 | Jain et al. | |
| 2024/0406183 A1 * | 12/2024 | Comeras | H04L 63/104 |
| 2025/0081157 A1 * | 3/2025 | Jain | H04W 28/0205 |

* cited by examiner

300 ⟍

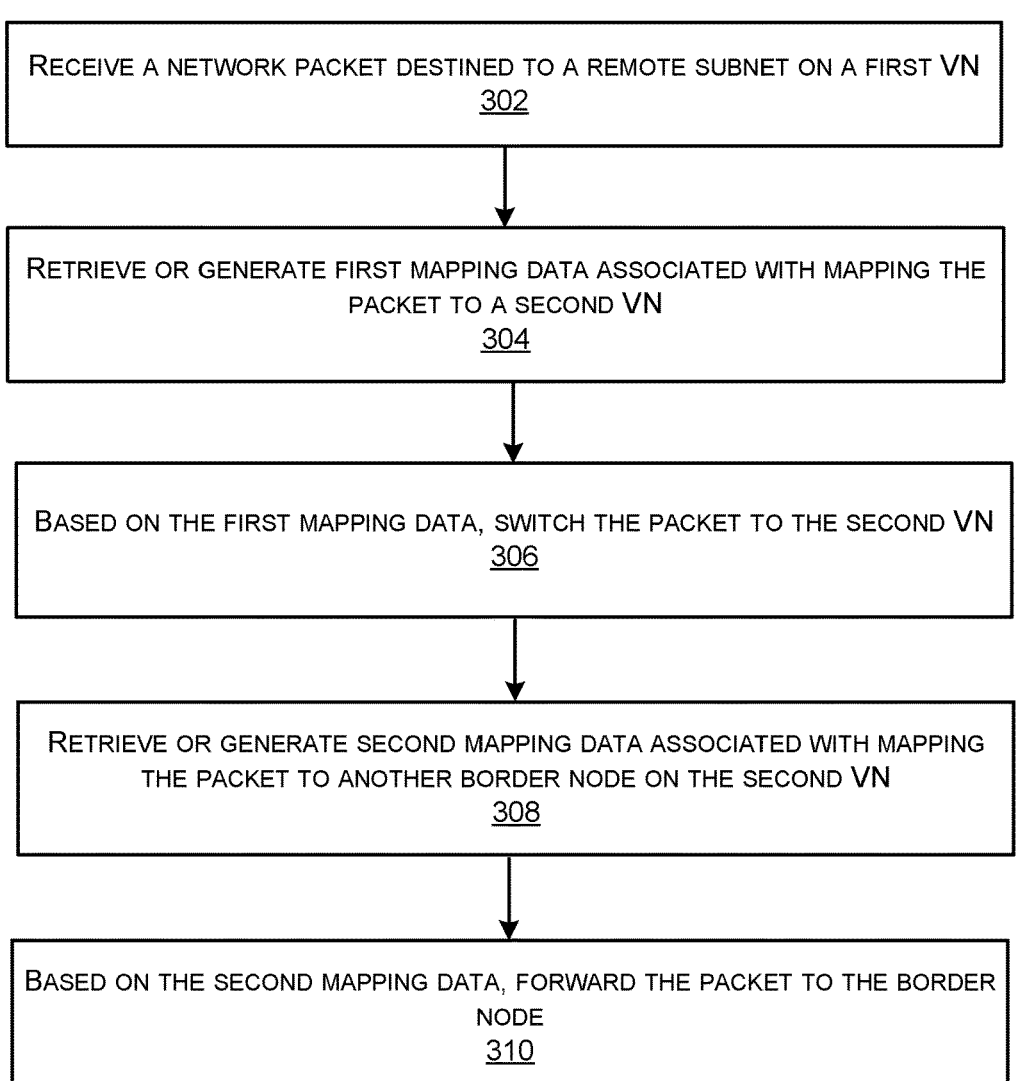

RECEIVE A NETWORK PACKET DESTINED TO A REMOTE SUBNET ON A FIRST VN
302

RETRIEVE OR GENERATE FIRST MAPPING DATA ASSOCIATED WITH MAPPING THE PACKET TO A SECOND VN
304

BASED ON THE FIRST MAPPING DATA, SWITCH THE PACKET TO THE SECOND VN
306

RETRIEVE OR GENERATE SECOND MAPPING DATA ASSOCIATED WITH MAPPING THE PACKET TO ANOTHER BORDER NODE ON THE SECOND VN
308

BASED ON THE SECOND MAPPING DATA, FORWARD THE PACKET TO THE BORDER NODE
310

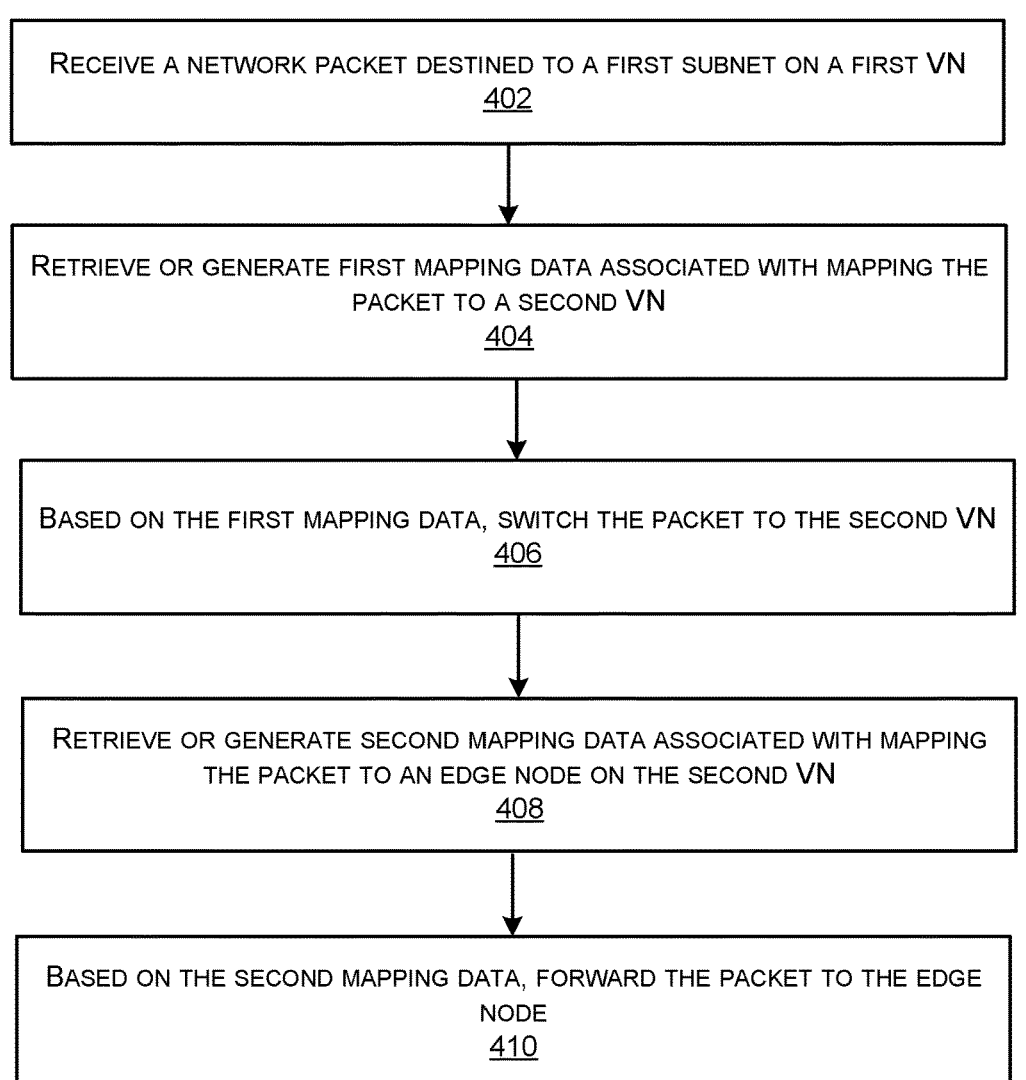

RECEIVE A NETWORK PACKET DESTINED TO A FIRST SUBNET ON A FIRST VN
402

RETRIEVE OR GENERATE FIRST MAPPING DATA ASSOCIATED WITH MAPPING THE PACKET TO A SECOND VN
404

BASED ON THE FIRST MAPPING DATA, SWITCH THE PACKET TO THE SECOND VN
406

RETRIEVE OR GENERATE SECOND MAPPING DATA ASSOCIATED WITH MAPPING THE PACKET TO AN EDGE NODE ON THE SECOND VN
408

BASED ON THE SECOND MAPPING DATA, FORWARD THE PACKET TO THE EDGE NODE
410

NETWORK SEGMENTATION IN MULTI-SITE COMPUTER NETWORKS

TECHNICAL FIELD

The present invention relates to the field of computer networking and, more specifically, to techniques for enabling efficient and secure communication between network segments across a network fabric.

BACKGROUND

In modern network environments, particularly in enterprise and data center networks, it is common to have multiple virtual networks (VNs) or segments that need to communicate with each other across a shared network infrastructure. These VNs are often used to isolate different tenants, applications, or services for security, performance, and policy enforcement reasons.

Traditionally, when VNs need to communicate across a transit network, such as a service provider network or an Internet Protocol (IP) fabric, traffic from each VN is carried in its own separate overlay or virtual routing and forwarding (VRF) instance. This approach, however, can lead to inefficient use of network resources and increased complexity as the number of VNs grows.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

FIG. 3 is a flowchart diagram of an example process for routing the packet received from a local subnet and destined for a remote subnet.

FIG. 4 is a flowchart diagram of an example process for routing a packet received from a remote border node and destined for a local subnet.

DESCRIPTION OF EXAMPLE EMBODIMENTS

Overview

Figure 1:
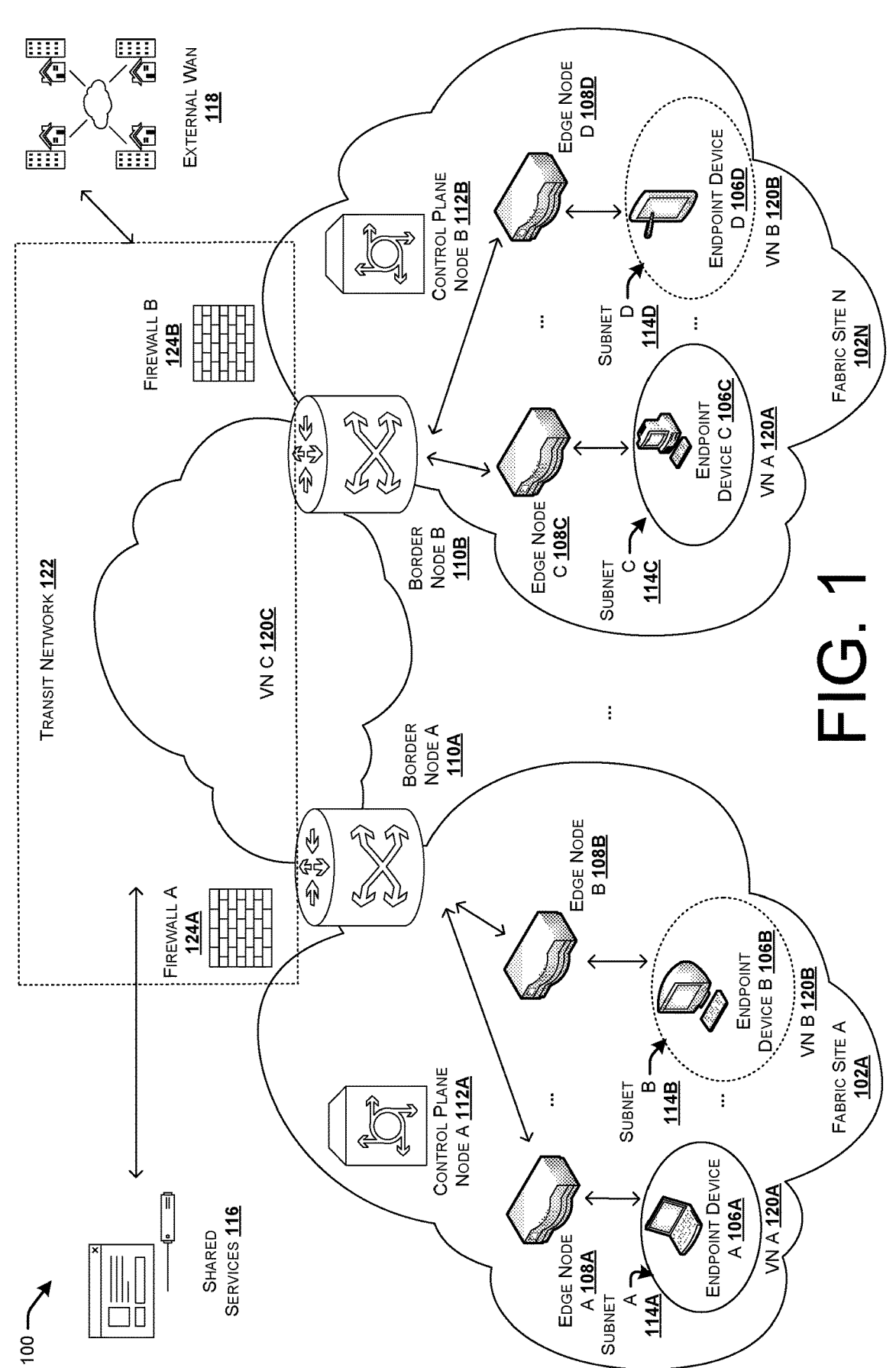
FIG. 1 provides an example network with fabric sites and a transit network.

This disclosure describes techniques for enabling multiple subnets across multiple fabric sites and associated with multiple network segments to communicate with each other using a shared network infrastructure, such as a transit network. In some cases, the techniques described herein relate to a method including receiving, by a border device associated with a first fabric site and on a transit virtual network (VN) associated with one or more segment VNs, a network packet, wherein the network packet includes a payload, is destined for a first subnet associated with the first fabric site, and transmitted from a second subnet associated with a second fabric site, and the first subnet and the second subnet are associated with a segment VN of the one or more segment VNs. The method may further include determining, by the border device, that the network packet is destined for the first subnet. The method may further include, based on determining that the network packet is destined for the first subnet and by the border device, at least one of retrieving or generating first mapping data, wherein the first mapping data assigns the border device as routing locator for any data packets received on the transit VN and destined for the first subnet associated with the segment VN. The method may further include assigning, by the border device, the network packet to the segment VN based on the first mapping data. The method may further include, based on receiving the network packet on the segment VN and by the border device, at least one of retrieving or generating second mapping data, wherein the second mapping data assigns a first edge device as routing locator for any data packets received on the segment VN and destined for the first subnet. The method may further include routing, by the border device, the network packet to the first edge device.

Additionally, the techniques described herein may be performed by a system and/or device having non-transitory computer-readable media storing computer-executable instructions that, when executed by one or more processors, performs the method described above.

EXAMPLE EMBODIMENTS

This disclosure describes techniques for enabling multiple subnets across multiple fabric sites and associated with multiple network segments (e.g., virtual networks (VNs) and/or virtual routing and forwarding instances (VRFs)) to communicate with each other using a shared network infrastructure, such as a service provider network (e.g., a service provider network with or without a common firewall). In some cases, the techniques described herein include using a common transit VN (e.g., a common provider VN) in the shared network infrastructure as well as border devices that enable switching traffic between the common transit VNs and segment VNs (e.g., subscriber VNs) for data transmission to and/or from the common transit VN (e.g., before and/or after data transmission using the common transit VN). However, while various implementations of the techniques disclosed herein are described with reference to VN-based network segmentation, a person of ordinary skill in the relevant technology will recognize that the disclosed techniques can be extended to other types of network segmentation, such as VRF-based segmentation and/or security-group-based segmentation. In some cases, the segment VNs enable macro-segmentation of a software-defined access (SDA) network (e.g., an SDA network using extranets and/or virtual private networks (VPNs)).

In some cases, a border device maintains two types of mapping entries (e.g., map-caches): transit mapping entries (e.g., proxy map-caches) and local mapping entries (e.g., regular map-caches). A mapping entry may be a data entry that associates a packet destined for a destination subnet and received on a source VN to at least one of a routing locator (RLOC) or a destination VN. An RLOC may be an identifier of a next-hop device for forwarding the packet, while the destination VN may be the VN on which the packet is forwarded to the RLOC. A transit mapping entry may be configured to represent forwarding information for packets received on a transit VN. For example, a transit mapping entry may: (i) associate a packet destined for a local subnet and received on a transit VN to a local border device and the transit VN, or (ii) associate a packet destined for a remote subnet and received on a transit VN to a remote border device and the transit VN. A local mapping entry may be configured to represent forwarding information for packets received on a segment VN. For example, a local mapping entry may: (i) associate a packet destined for a local subnet and received on a segment VN to a local edge device and the segment VN, or (ii) associate a packet destined for a remote subnet and received on a segment VN to a local border device and the transit VN.

For example, consider a network with two different fabric sites, where fabric site A includes a subnet S1 and a subnet S2, while fabric site B includes a subnet S3 and a subnet S4. In this example, S1 and S3 may be associated with a VN1, while S2 and S4 may be associated with a VN2. Both VN1 and VN2 may be segment VNs, while the network may also include a transit VN called VN3. To forward a packet from S1 to S3, the BN1 may receive the packet from an edge device and then retrieve or generate a first mapping entry that associates S3 with an interface of BN1 that corresponds to VN3. For example, if the network address of S3 is 30.0.0.0/8, the first mapping entry may be "In VN1: 30.0.0.0/8 ENCAP VN3 RLOC BN1," which designates BN1 on VN3 as the RLOC for a packet destined for S3 that is received on VN1. Based on this first mapping entry, BN1 may switch the packet from VN1 to VN3. The first mapping entry may be a local mapping entry.

After BN1 switches the packet from VN1 to VN3, BN1 may retrieve or generate a second mapping entry that associates S3 with BN2 on VN3. For example, the second mapping entry may be "In VN3: 30.0.0.0/8 ENCAP VN3 RLOC BN2," which designates BN2 on VN3 as the RLOC for a packet destined for S3 that is received on VN3. Based on this first mapping entry, BN1 may forward the packet to BN2 using VN3. The second mapping entry may be a transit mapping entry.

After BN2 receives the packet on VN3, BN2 may retrieve or generate a third mapping entry that associates S3 with BN2 on VN1. For example, the third mapping entry may be "In VN3: 30.0.0.0/8 ENCAP VN1 RLOC BN2," which designates BN2 on VN1 as the RLOC for a packet destined for S3 that is received on VN3. Based on this first mapping entry, BN2 may switch the packet from VN3 to VN1. The third mapping entry may be a transit mapping entry.

After BN2 switches the packet from VN3 to VN1, BN2 may retrieve or generate a fourth mapping entry that associates S3 with an edge router of fabric site B that is associated with S3. For example, the fourth mapping entry may be "In VN1: 30.0.0.0/8 ENCAP VN1 RLOC EN3," which designates EN3 on VN1 as the RLOC for a packet destined for S3 that is received on VN1. Based on this fourth mapping entry, BN2 may forward the packet to EN3. The fourth mapping entry may be a local mapping entry.

Accordingly, as this example illustrates, using transit mapping entries and local mapping entries enables a border device to: (i) switch a packet destined for a remote subnet to a transit VN, and (ii) switch a packet received on the transit VN to a segment VN. This enables facilitating communication between multiple fabric sites and across multiple VNs using a single transit VN. In some cases, as the number of VNs in a multi-fabric site network increases, the architecture may manage this increase by increasing the number of transit mapping entries stored on border devices, instead of increasing the number of transit VNs. Accordingly, in some cases, the techniques described herein reduce the scalability of enabling network segmentation and cross-fabric site intra-segment communication in multi-fabric site networks.

In some cases, the techniques described herein enable programming mapping entries (e.g., map-caches) on a border device, for example based on input data provided using a command-line interface (CLI). In some cases, a user (e.g., an administrator user) and/or a program may program the mapping entrees on the border device. In some cases, the mapping entries are programmed manually, for example by a user using a command-line interface or a graphical user interface provided by the border device.

In some cases, the techniques described herein enable a border device to determine mapping entries by querying routing data (e.g., routing locator identification data, such as endpoint identifier (EID) to RLOC mappings) stored on a control policy node associated with the border device's fabric site (e.g., associated as a co-located and/or external control plane of all nodes and/or devices of the fabric site). In some cases, the control policy node may be configured to receive routing data from other control policy nodes in the network (e.g., from a set of control policy nodes each associated with a respective network fabric site) using a publish-subscribe (pub-sub) mechanism. In a pub-sub model, each control policy node associated with a respective fabric site may operate as both a publisher and a subscriber. As a publisher, the control policy node may announce the subnets that are local to the respective fabric site and their associated VNs. As a subscriber, the control policy node may receive similar announcements about subnets and VNs of other network fabric sites from other control policy nodes.

In some cases, the control policy nodes are configured to advertise and/or receive routing data using a pull-based overlay protocol, such as using for example, locator/identifier separation protocol (LISP), border gateway protocol (BGP), BGP ethernet virtual private network (BGP EVPN), and/or the like. For example, when using LISP, a control policy node may operate as a Map Server and Map Resolver (MSMR) that: (i) receives EID to RLOC mappings from egress tunnel routers (e.g., border devices and/or edge devices) within the network, and/or (ii) receives a request for resolving the RLOC of an EID from a network device (e.g., an ingress tunnel router) based on the EID-to-RLOC mappings.

Accordingly, in some cases, the control policy node operates as both a Map Server (MS) and a Map Resolver (MR). As an MS, the control policy node receives endpoint identification data, network topology data, and/or EID-to-RLOD mappings from the egress tunnel routers. These egress tunnel routers may be border devices and/or edge devices that are configured to encapsulate outgoing packets and decapsulate incoming packets. The egress tunnel routers may register their EID prefixes and corresponding RLOCs with the MS using Map-Register messages. As an MR, the control policy node receives queries from ingress tunnel routers for the RLOC corresponding to a particular EID. When an ingress tunnel router has a packet to forward to a destination EID, the ingress tunnel router may send a Map-Request message to the control policy node. In response, the control policy node may query EID-to-RLOC mappings to determine the corresponding RLOC and report the determined RLOC to the ingress tunnel router in a Map-Reply message. In some cases, a control policy node includes one MSMR device, while in other cases a control policy node may include an MS device and an MR device.

In some cases, when a border device first receives a packet destined for a subnet on a VN, the border device queries the mapping entries associated with that border device to determine whether those entries include a valid mapping entry corresponding to the destination subnet and VN. For example, if the border device receives a packet for a destination subnet with the network identifier 30.0.0.0/8 and on VN3, the border device may query its mapping entries to determine whether a mapping entry conforming to the pattern "In VN3: 30.0.0.0/8" exists and whether that mapping entry is valid. A mapping entry may be determined to be invalid after a defined period of time after it is created and/or last updated (e.g., last confirmed). In some cases, if the border device determines that a valid mapping entry for the destination device exists, the border device may use that mapping entry to forward the packet. However, if the border device determines that a valid mapping entry does not exist, the border device may generate the mapping entry. The border device may generate the mapping entry by querying a control policy node for mapping data (e.g., based on the Map-Reply message sent in response to a Map-Request message to the control policy node), and/or by subscribing (e.g., sending a subscription request) to the control policy node and receiving publication(s) from the control policy node. Once generated, the mapping entry may be valid for a defined period of time (e.g., for one minute, for 24 hours, until the next publication is received, and/or the like).

For example, consider a scenario in which a border device BN1 receives, at a time T1, on a transit VN called VN3, and from another fabric site's border device BN2, a first packet for a subnet S1 that is stored on the local network fabric site and associated with a segment VN called VN1. In this example, if the network EIN for S1 is 10.0.0.0/8 BN1 may first query its mapping entries to determine whether it has a mapping entry corresponding to 10.0.0.0/8 and VN3. Suppose that no such entry exists. In this case, BN1 may send a Map-Request message to its associated control policy node to receive RLOC information for S1-destined packets on VN3. Based on the received mapping information, BN1 may generate the mapping entry "In VN3: 10.0.0.0/8 ENCAP VN1 RLOC BN1," which designates BN1 on VN1 as the RLOC for the packet. BN1 may then use this mapping entry to switch the packet from VN3 to VN1. Afterward, BN1 may query its mapping entries for an entry corresponding to 10.0.0.0/8 and VN1. Assuming no such entry exists, BN1 may send a Map-Request message to its associated control policy node to receive RLOC information for S1-destined packets on VN1. Based on the received mapping information, BN1 may generate the mapping entry "In VN1: 10.0.0.0/8 RLOC EN1," which designates edge device EN1 on VN1 as the RLOC for the packet. BN1 may then use this mapping entry to forward the packet to EN1 on VN1.

In this example, if BN1 receives a second packet destined for S1 on VN3 at a time T2 that is within a threshold period of T1, BN1 may first query its mapping entries to retrieve the mapping entry "In VN3: 10.0.0.0/8 ENCAP VN1 RLOC BN1," and use this mapping entry to switch the second packet from VN3 to VN1. BN1 may then query its mapping entries for "In VN1: 10.0.0.0/8 RLOC EN1," and forward the second packet to EN1 based on this mapping entry.

In some cases, the techniques described herein enable reducing the number of mapping entries that a border device needs to store. In some cases, by allocating mapping entries to subnets instead of individual endpoint devices, the techniques described herein reduce the number of required mapping entries. This subnet-level mapping reduces the storage complexity associated with storing mapping entries on border devices and/or conserves the ternary content-addressable memory (TCAM) space of border devices.

In some cases, the techniques described herein increase the security of multi-fabric site networks by enabling efficient deployment of security services (e.g., firewalls, intrusion detection system(s), and/or the like) before transmission of packets on the transit VN. In some cases, before a border device transmits a packet to another border device on the transit VN, the border device may use a security service to validate the packet and only transmit the packet if the security service validates the packet. The validation service may validate the packet from a source device to a destination device based on one or more security policies, such as based at least in part on whether the source device is associated with a security group (e.g., whether a security group tag (SGT)) that is authorized to access the destination device, and/or based at least in part on whether an SGT associated with the source device is registered to control plane in addition to its IP address. For example, in some cases, the validation service may be configured to validate the packet if the source device's security group is authorized to access the destination device (e.g., a destination device belonging to another security group which is also registered to the control plane). Accordingly, in some cases, by enabling a security service to enforce security policies at the edge and/or border of a local fabric site using a transit VN and/or using a service and/or SGT control plane to direct the traffic for service insertion, the techniques described herein enable the implementation of micro-segmentation policies in a multi-fabric site network while still using a single VN for transit.

In some cases, in addition to and/or instead of a security service (e.g., a firewall service) that is applied before a border device transmits a packet over the transit VN and to a different fabric site, the multi-fabric site network architecture includes a security service that is applied before a border device transits a packet over a segment VN and within the same fabric site. For example, in some cases, the multi-fabric site network architecture includes at least one of the following: (i) given N fabric sites, N security services each deployed in relation to one of the network fabric sites and configured to validate packets before packet transmission over the transit VN and to a remote fabric site, (ii) given N fabric sites, N security services each deployed in relation to one of the network fabric sites and configured to validate packets before packet transmission over a segment VN and to the same network fabric site, or (iii) one or more security services implemented on the transit VN and as part of the shared network infrastructure.

In some cases, the techniques described herein enable inserting a security service (e.g., a firewall service) in the transit VN and/or at the border of a transit VN and a network fabric site to enforce one or more security policies (e.g., one or more SGT policies) across fabric sites. In some cases, the techniques described herein enable inserting a security service in a segment VN to enforce one or more security policies within the segment VN and in a single site. While various implementations of the techniques described herein are described with reference to inserting security services in a multi-fabric site network architecture, a person of ordinary skill in the relevant technology will recognize that these techniques may be extended to other network services such as load balancer services and/or rate-limiting services.

FIG. 1 provides an example network 100 with N fabric sites, such as a fabric site A 102A and a fabric site N 102N as well as a transit network 122. The network 100 may, for example, be a software-defined access (SDA) network. An SDA network may be a network that leverages software-defined networking (SDN) principles to manage and control provisioning, management, and security of network access. An SDA network may include one or more fabric sites each representing a distinct location and/or area associated with the network, such as a branch office, campus, or data center. An SDA network may include a network controller (not depicted) that is configured to provision, monitor, and manage the network infrastructure, including fabric sites, edge nodes, border nodes, and/or the transit network. The controller may use SDN principles to dynamically adjust network configurations, enforce security policies, and optimize traffic flow based on monitored network conditions. In FIG. 1, both fabric site A 102A and fabric site B 102B have one or more endpoint devices associated with VN A 120A and VN B 120B. In general, a network may include any number of fabric sites, and a fabric site may include any number of (e.g., multiple) VNs.

As depicted in FIG. 1, each fabric site may include one or more endpoint devices, one or more edge nodes (e.g., one or more edge devices, such as one or more edge routers), and one or more border nodes (e.g., one or more border devices, such as one or more border routers). For example, fabric site A 102A includes the endpoint device A 106A, the endpoint device B 106B, edge node A 108A, the edge node B 108B, and the border node A 110A. Moreover, fabric site N 102N includes the endpoint device C 106C, the endpoint device D 106D, the edge node C 108C, the edge node D 108D, and the border node B 110B.

An endpoint device may be a device that is configured to connect to other network devices, to external networks, and/or to one or more shared network services using the network 100. The endpoint device may include an endpoint device (e.g., a computer, smartphone, and/or tablet), an Internet of Things (IOT) device (e.g., a sensor and/or smart appliance), and/or the like.

In some cases, the endpoint devices in a fabric site may be divided into one or more subnets. A subnet may include a subset of endpoint devices in a network fabric site that are associated with a common VN. For example, as depicted in FIG. 1, subnet A 114A includes endpoint devices on fabric site A 102A that are associated with VN A 120A, including endpoint device A 106A. Additionally, subnet B 114B includes endpoint devices on fabric site A 102A that are associated with VN B 120B, including endpoint device B 106B. Furthermore, subnet C 114C includes endpoint devices on fabric site N 102N that are associated with VN A 120A, including endpoint device C 106C. Additionally, subnet D 114D includes endpoint devices on fabric site N 102N that are associated with VN B 120B, including endpoint device D 106D.

An edge node may be configured to provide network access to one or more endpoint devices within a fabric site, such as one or more endpoint devices associated with one or more subnets. An edge node may be configured to authenticate endpoint devices, apply quality of service (QOS) policies on packets received from the endpoint devices, and/or encapsulate the packets from the endpoint devices with the appropriate VN tags before forwarding those packets to the border node. In FIG. 1, edge node A 108A and edge node B 108B provide network access to endpoint device A 106A and endpoint device B 106B, respectively, in fabric site A 102A. Similarly, edge node C 108C and edge node D 108D provide network access to endpoint device C 106C and endpoint device D 106D, respectively, in fabric site N 102N.

In some cases, an edge node is configured to provide network access to one or more subnets. For example, in FIG. 1, edge node A 108A is configured to provide network access to subnet A 114A, edge node B 108B is configured to provide network access to subnet B 114B, edge node C 108C is configured to provide network access to subnet C 114C, and edge node D 108D is configured to provide network access to subnet D 114D.

A border node may be configured to provide connectivity between a fabric site and the transit network 122. For example, in FIG. 1, border node A 110A is configured to provide connectivity between fabric site A 102A and the transit network 122, while border node B 110B is configured to provide connectivity between fabric site N 102N and the transit network 122. The transit network 122 may be configured to enable data transmission using VN C 120C, which is a transit VN. A transit VN may be configured to enable communication between subnets across fabric sites, such as between subnets across fabric sites that are associated with the same VN. For example, VN C 120C may enable an endpoint device in subnet A 114A to communicate with an endpoint device in subnet C 114C. As another example, VN C 120C may enable an endpoint device in subnet B 114B to communicate with an endpoint device in subnet D 114D. In some cases, transit network 122 and/or VN C 120C may be configured to enable communication between endpoint devices and/or network devices (e.g., edge nodes and/or border nodes) in fabric sites and at least one of: (i) one or more shared network services 116 (e.g., firewall services, IDS services, intrusion prevention system (IPS) services, load balancer services, and/or the like), or (ii) an external wide area network (WAN) 118 (e.g., the Internet, a private VAN, and/or the like). In some cases, the transit network 122 is a service provider network.

In some cases, a border node is configured to: (i) forward communications from remote fabric sites that are received on VN C 120C, and/or (ii) forward communications to remote fabric sites via VN C 120C. The border nodes may be configured to perform these operations in accordance with the various techniques described herein, such as the techniques described herein with reference to FIG. 2. In some cases, a border node is configured to perform one or more of the operations (i)-(ii) based on mapping entries associated with the border node. The mapping entries associated with a border node may be stored on the border node, on a storage medium (e.g., a TCAM space) associated with the border node, and/or on a remote storage medium. In some cases, in addition to forwarding communications received from or destined to a remote subnet, a border node is also configured to forward communications received from one local subnet and destined to another local subnet (e.g., from a subnet associated with a first VN on the same fabric site to a subnet associated with a second VN on the same fabric site).

To forward communications received from or destined to a remote subnet, a border node may use one or more mapping entries (e.g., one or more map-caches). A mapping entry may identify a routing locator (e.g., a next-hop router and/or a routing interface on the same router) for packets destined for a particular subnet and/or received on a particular VN. Examples of mapping entries include transit mapping entries and local mapping entries, as further described above. In some cases, the border node generates a mapping entry by querying a control policy node, for example by querying a control policy node associated with the border node's network fabric site. For example, in FIG. 1, the border node A 110A may be configured to generate mapping entries by querying the control policy node A 112A, while the border node B 110B may be configured to generate mapping entries by querying the control policy node B 112B. Examples of mapping entries are described below with reference to FIG. 2.

A control policy node may include one or more network devices that are configured to manage the control plane of the network 100. The control plane may maintain the network topology, exchange routing information, and program the data plane (e.g., the forwarding tables) on the network devices in the network 100. In FIG. 1, control policy node A 112A is associated with fabric site A 102A, while control policy node B 112B is associated with fabric site N 102N. In some cases, the transit network 122 may also include one or more control policy nodes. In some cases, a control policy node is configured to advertise and/or receive routing data using a pull-based overlay protocol, such as using LISP, BGP, and/or BGP EVPN. In some cases, control policy nodes communicate with each other over a dedicated control plane channel, which may be logically separate from the data plane traffic. In some cases, a control policy node is configured to manage network devices in the network 100, for example by configuring the VN membership and/or routing policies of edge nodes and/or border nodes, programming the forwarding tables of edge nodes and/or border nodes, monitoring performance of network devices and taking corrective action when necessary, and/or enforcing security policies (e.g., SGT policies, access control lists (ACLs), and/or) across the network 100.

As further depicted in FIG. 1, the network 100 includes one or more firewalls, such as firewall A 124A and the firewall B 124B. A firewall may be configured to validate a packet before the packet is routed by a border device and/or transmitted on the VN C 120C. For example, in FIG. 1, the firewall A 124A may be configured to validate a packet from a subnet in fabric site A 102A before the packet is transmitted on VN C 120C to a remote fabric site (e.g., fabric site N 102N). In some cases, in addition to or instead of packets destined for remote fabric sites, the firewall A 124A may be configured to validate a from a subnet in fabric site A 102A to another subnet in fabric site A 102A. As another example, in FIG. 1, the firewall B 124B may be configured to validate a packet from a subnet in fabric site N 102N before the packet is transmitted on VN C 120C to a remote fabric site (e.g., fabric site A 102A). In some cases, in addition to or instead of packets destined for remote fabric sites, the firewall B 124B may be configured to validate a from a subnet in fabric site N 102N to another subnet in fabric site N 102N. In some cases, in addition to or instead of firewall A 124A and the firewall B 124B, the network 100 includes one or more firewalls installed on the transit network 122 and/or in association with VN C 120C.

In some cases, to validate a packet, a firewall (e.g., firewall A 124A and/or the firewall B 124B) may use one or more security policies, one or more ACLs, and/or one or more SGTs. For example, a firewall may block a packet from a first device to a second device if one or more security policies, one or more ACLs, and/or one or more SGTs block the first device from sending a packet to and/or communicating with the second device. In some cases, a firewall may be configured to validate a packet based on one or more security rules defined based on the packet's source and destination IP addresses, source and destination port numbers, and/or the communication protocols to generate and/or route the packet. These rules may be defined in the form of ACLs, which specify the conditions under which a packet should be allowed or blocked. In some cases, a firewall in an SDA network may use SGTs to enforce security policies based on the identity and/or role of the endpoint devices. An SGT may be a tag that is assigned to an endpoint device based on the device's identity, role, and/or other attributes. For example, an SGT may be assigned to an endpoint device based on the device's user identity, device type, application, and/or security posture.

In some cases, when a packet is sent from an endpoint device, the edge node may be configured to assign the appropriate SGT to the packet based on the endpoint device's identity and/or one or more other attributes associated with the endpoint device. The packet's SGT may then be maintained along with the packet as the packet traverses the network to enable the firewalls and/or other security devices to enforce security policies based on the SGT. For example, suppose that endpoint device A 106A is assigned an SGT of "Employee," while endpoint device B 106B is assigned an SGT of "Guest." Firewall A 124A may be configured with a security policy that allows packets with the "Employee" SGT to access certain resources (e.g., internal servers) but blocks packets with the "Guest" SGT from accessing those same resources. When a packet from endpoint device A 106A reaches firewall A 124A, the firewall may examine the packet's SGT and determine that it is allowed to access the desired resource based on the "Employee" SGT. On the other hand, when a packet from endpoint device B 106B reaches firewall A 124A, the firewall may examine the packet's SGT and determine that it should be blocked based on the "Guest" SGT.

In some cases, by enforce SGT-based security policies, firewalls in an SDA network (e.g., firewall A 124A and/or the firewall B 124B) can enforce granular, context-aware security policies that take into account not only the source and destination of a packet but also the identity and role of the endpoint devices involved in the communication. In some cases, a firewall in an SDA network may also be configured to perform other security functions, such as intrusion detection and prevention (e.g., to detect and block potential security threats, such as malware, viruses, and/or hacking attempts), application-layer filtering (e.g., to inspect and/or filter traffic at the application layer by allowing or blocking specific applications, protocols, and/or web content based on predefined policies), identity-based policy enforcement (e.g., integrating with identity and access management (IAM) systems to enforce security policies based on user identity and/or role), and/or encrypted traffic inspection (e.g., to decrypt and inspect encrypted traffic, such as hypertext transfer protocol secure (HTTPS) traffic, to detect and block potential threats that may be hidden in encrypted communications).

In some cases, a firewall associated with a fabric site enables bidirectional validation of network packets associated with the fabric site. For example, firewall A 124A may enable bidirectional validation of network packets associated with the fabric site A 102A, while firewall B 124B may enable bidirectional validation of network packets associated with the fabric site N 102N. Bidirectional validation may include validating both incoming and outgoing packets for a particular fabric site.

Incoming packet validation may refer to the process of validating packets that are destined for endpoint devices within a particular fabric site. For example, firewall A 124A may validate packets that are destined for endpoint devices in fabric site A 102A, such as endpoint device A 106A and endpoint device B 106B. Outgoing packet validation may refer to the process of validating packets that originate from endpoint devices within a particular fabric site and are destined for endpoint devices in other fabric sites or external networks. For example, firewall A 124A may validate packets that originate from endpoint devices in fabric site A 102A, such as endpoint device A 106A and endpoint device B 106B, and are destined for endpoint devices in fabric site N 102N or external networks such as the Internet.

In some cases, a firewall may validate a packet based on one or more micro-segmentation policies. For example, a micro-segmentation policy may specify that only endpoint devices associated with a particular SGT, such as "Employee," are allowed to communicate with a specific set of servers or applications within a fabric site. A firewall enforcing this policy may validate packets based on the SGT of the source endpoint device and/or the destination device and/or application, and only allow packets that match the specified criteria. Micro-segmentation may refer to a security approach that involves dividing the network into small, isolated segments and defining granular security policies for communication between these segments. By applying security policies at a more granular level than traditional network segmentation (e.g., based on virtual local area networks (VLANs) and/or subnets), micro-segmentation may enable organizations to implement a more fine-grained and targeted security policy framework.

In some cases, the network 100 enables a network device in a subnet on one fabric site to communicate with another network device in another subnet on another fabric site (e.g., another subnet that is associated with the same segment VN but is on a different network fabric site) over a transit VN such as VN C 120C. For example, the network 100 may enable a device in subnet A 114A to communicate with a device in subnet C 114C and/or vice versa via VN C 120C. As another example, the network 100 may enable a device in subnet B 114B to communicate with a device in subnet D 114D, and/or vice versa. In some cases, a device can communicate with a device in a remote subnet using the techniques described herein, such as the techniques described herein in relation to FIG. 2.

Figure 2:
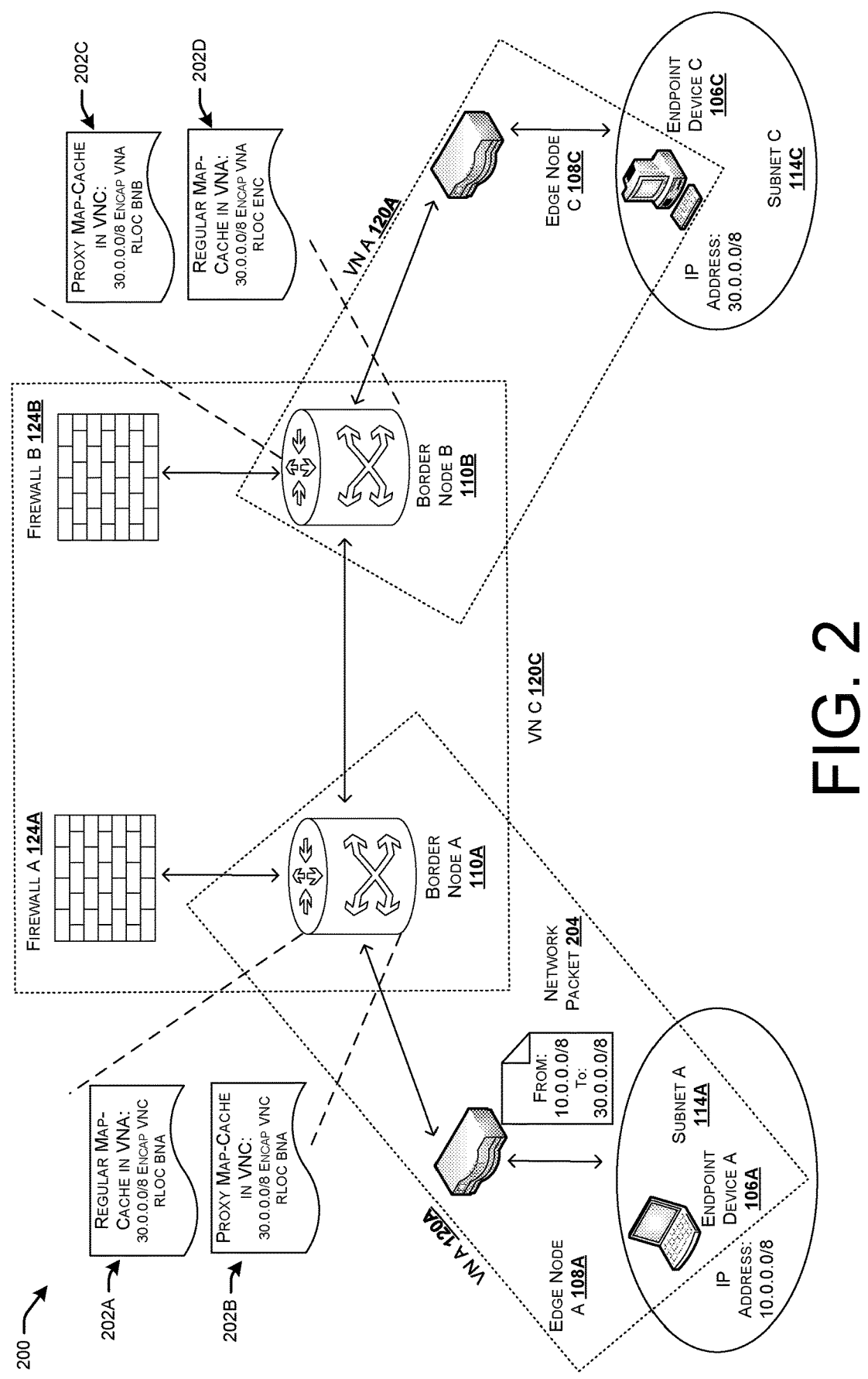
FIG. 2 provides an operational example of routing a packet between two remote subnets.

FIG. 2 provides an operational example 200 of routing a packet 204 from the endpoint device A 106A, which is in the subnet A 114A and associated with VN A 120A, to the endpoint device C 106C, which is in the subnet B 114B and associated with VN A 120A. In some cases, similar techniques may be used to route a packet from the endpoint device C 106C to the endpoint device A 106A, a packet from the endpoint device B 106B to endpoint device D 106D, and/or a packet from the endpoint device D 106D to the endpoint device B 106B.

As depicted in FIG. 2, the packet 204 contains a communication from a device in 10.0.0/8, which is the EID for subnet A 114A, to a device in 30.0.0/8, which is the EID for subnet C 114C. Edge node A 108A may forward the packet 204 to border node A 110A via VN A 120A. Before edge node A 108A forwards the packet 204 to border node A 110A, edge node A 108A may encapsulate the packet with data representing that the packet is associated with VN A 120A.

After border node A 110A receives the packet 204 via VN A 120A and detects that the packet 204 is destined for 30.0.0/8, border node A 110A may retrieve and/or generate the mapping entry A 202A. In some cases, after border node A 110A receives the packet 204 via VN A 120A and detects that the packet 204 is destined for 30.0.0/8, border node A 110A may determine whether a valid mapping entry exists for forwarding a packet that destined for 30.0.0/8 and received on VN A 120A. If such a valid entry exists, border node A 110A may retrieve that entry. Otherwise, border node A 110A may generate the mapping entry, for example by querying the control policy node A 112A.

As depicted in FIG. 2, mapping entry A 202A designates border node A 110A on VN C 120C as the RLOC for a packet destined for 30.0.0/8 that is received on VN A 120A. Based on the mapping entry A 202A, border node A 110A may switch the packet 204 to VN C 120C, for example by encapsulating the packet 204 with a tag associated with VN C 120C and/or forwarding the packet to an interface of border node A 110A that is associated with VN C 120C.

After border node A 110A switches the packet from VN A 120A to VN C 120C, border node A 110A may retrieve and/or generate the mapping entry B 202B. In some cases, after border node A 110A receives the packet 204 via VN C 120C and detects that the packet 204 is destined for 30.0.0/8, border node A 110A may determine whether a valid mapping entry exists for forwarding a packet that destined for 30.0.0/8 and received on VN C 120C. If such a valid entry exists, then border node A 110A may retrieve that entry. Otherwise, border node A 110A may generate the mapping entry, for example by querying the control policy node A 112A.

As depicted in FIG. 2, mapping entry B 202B designates border node B 110B on VN C 120C as the RLOC for a packet destined for 30.0.0/8 that is received on VN C 120C. Based on the mapping entry B 202B, border node A 110A may route the packet 204 to border node B 110B via VN C 120C. In some cases, before border node A 110A routes packet 204 to border node B 110B on VN C 120C, border node A 110A may validate the packet 204 and/or the communication using firewall A 124A.

After border node B 110B receives the packet from VN C 120C, border node B 110B may retrieve and/or generate the mapping entry C 202C. In some cases, after border node B 110B receives the packet 204 via VN C 120C and detects that the packet 204 is destined for 30.0.0/8, border node B 110B may determine whether a valid mapping entry exists for forwarding a packet that destined for 30.0.0/8 and received on VN C 120C. If such a valid entry exists, then border node B 110B may retrieve that entry. Otherwise, border node B 110B may generate the mapping entry, for example by querying the control policy node B 112B.

As depicted in FIG. 2, mapping entry C 202C designates border node B 110B on VN A 120A as the RLOC for a packet destined for 30.0.0/8 that is received on VN C 120C. Based on the mapping entry C 202C, border node B 110B may switch the packet 204 from VN C 120C to VN A 120A, for example by removing the tag associated with VN C 120C from the packet 204 and/or forwarding the packet to an interface of border node B 110B that is associated with VN A 120A.

After border node B 110B switches the packet from VN C 120C to VN A 120A, border node B 110B may retrieve and/or generate the mapping entry D 202D. In some cases, after border node B 110B receives the packet 204 via VN A 120A and detects that the packet 204 is destined for 30.0.0/8, border node B 110B may determine whether a valid mapping entry exists for forwarding a packet that destined for 30.0.0/8 and received on VN A 120A. If such a valid entry exists, then border node B 110B may retrieve that entry. Otherwise, border node B 110B may generate the mapping entry, for example by querying the control policy node B 112B.

As depicted in FIG. 2, mapping entry D 202D designates edge node C 108C as the RLOC for a packet destined for 30.0.0/8 that is received on VN A 120A. Based on the mapping entry D 202D, border node B 110B may route the packet 204 to edge node C 108C via VN A 120A. In some cases, after edge node C 108C receives the packet 204 from border node B 110B via VN A 120A, edge node C 108C may decapsulate the packet 204, for example by removing any encapsulation that was added to the packet 204 to indicate the packet 204's association with VN A 120A. Edge node C 108C may then forward the decapsulated packet 204 to endpoint device C 106C.

In some cases, one or more of the mapping entries 202A-202D may be associated with a firewall, such as firewall A 124A and/or firewall B 124B. For example, the mapping entry A 202A may specify that a packet destined for 30.0.0/8 should be validated by firewall A 124A before being routed from VN A 120A to VN C 120C. As another example, the mapping entry C 202C may specify that a packet destined for 30.0.0/8 should be validated by firewall B 124B before being routed from VN C 120C to VN A 120A. In such cases, border node A 110A and/or border node B 110B may forward the packet 204 to firewall A 124A and/or firewall B 124B for validation before routing the packet 204 in accordance with the corresponding mapping entry. If the firewall validates the packet 204, then the border node may route the packet 204 in accordance with the mapping entry. However, if the firewall does not validate the packet 204, then the border node may drop the packet 204 and/or return an error message to the source device.

FIG. 3 is a flowchart diagram of an example process 300 for routing the packet received from a local subnet and destined for a remote subnet. Process 300 may, for example, be performed by a border node (e.g., border node A 110A and/or border node B 110B, as depicted in FIGS. 1-2).

As depicted in FIG. 3, at operation 302, an example system receives a packet destined to a remote subnet on a first VN (e.g., a segment VN). The system may, for example, receive the packet from an edge node.

At operation 304, the system retrieves or generates first mapping data associated with packets destined for the destination remote subnet and received on the first VN. The first mapping data may designate the system itself as the RLOC for the packet and associate the packet with a second VN (e.g., a transit VN).

At operation 306, the system switches the packet to the second VN based on the first mapping data. The system may encapsulate the packet with the first VN's tag and forward the packet to an input interface associated with the second VN. In some cases, prior to switching the packet to second VN, the system may validate the packet using a firewall and/or other security service.

At operation 308, the system retrieves or generates second mapping data associated with packets destined for the destination remote subnet and received on the second VN. The second mapping data may designate a border node on a remote fabric site as the RLOC for the packet and associate the packet with the second VN.

At operation 310, the system forwards the packet to the remote border node on the second VN based on the second mapping data. In some cases, forwarding the packet on the second VN includes determining a next-hop address on the second VN for forwarding the packet to the remote border node. In some cases, prior to forwarding the packet to the remote border on the second VN, the system may encapsulate the packet with the second VN's tag.

FIG. 4 is a flowchart diagram of an example process 400 for routing a packet received from a remote border node and destined for a local subnet. Process 400 may, for example, be performed by a border node (e.g., border node A 110A and/or border node B 110B, as depicted in FIGS. 1-2).

As depicted in FIG. 4, at operation 402, an example system receives a packet from the remote border node and on a first VN (e.g., a transit VN). The system may, for example, receive the packet via a transit network and on a transit VN.

At operation 404, the system retrieves or generates first mapping data associated with packets destined for the destination local subnet and received on the first VN. The first mapping data may designate the system itself as the RLOC for the packet and associate the packet with a second VN (e.g., a segment VN, such as the segment VN associated with the destination subnet).

At operation 406, the system switches the packet to the second VN based on the first mapping data. The system may encapsulate the packet with the second VN's tag and forward the packet to an input interface associated with the second VN. In some cases, prior to switching the packet to second VN, the system may validate the packet using a firewall and/or other security service.

At operation 408, the system retrieves or generates second mapping data associated with packets destined for the destination local subnet and received on the second VN. The second mapping data may designate an edge node associated with the destination subnet as the RLOC for the packet.

At operation 410, the system forwards the packet to the edge node on the second VN based on the second mapping data. In some cases, forwarding the packet on the second VN includes determining a next-hop address on the second VN for forwarding the packet to the edge node.

Figure 5:
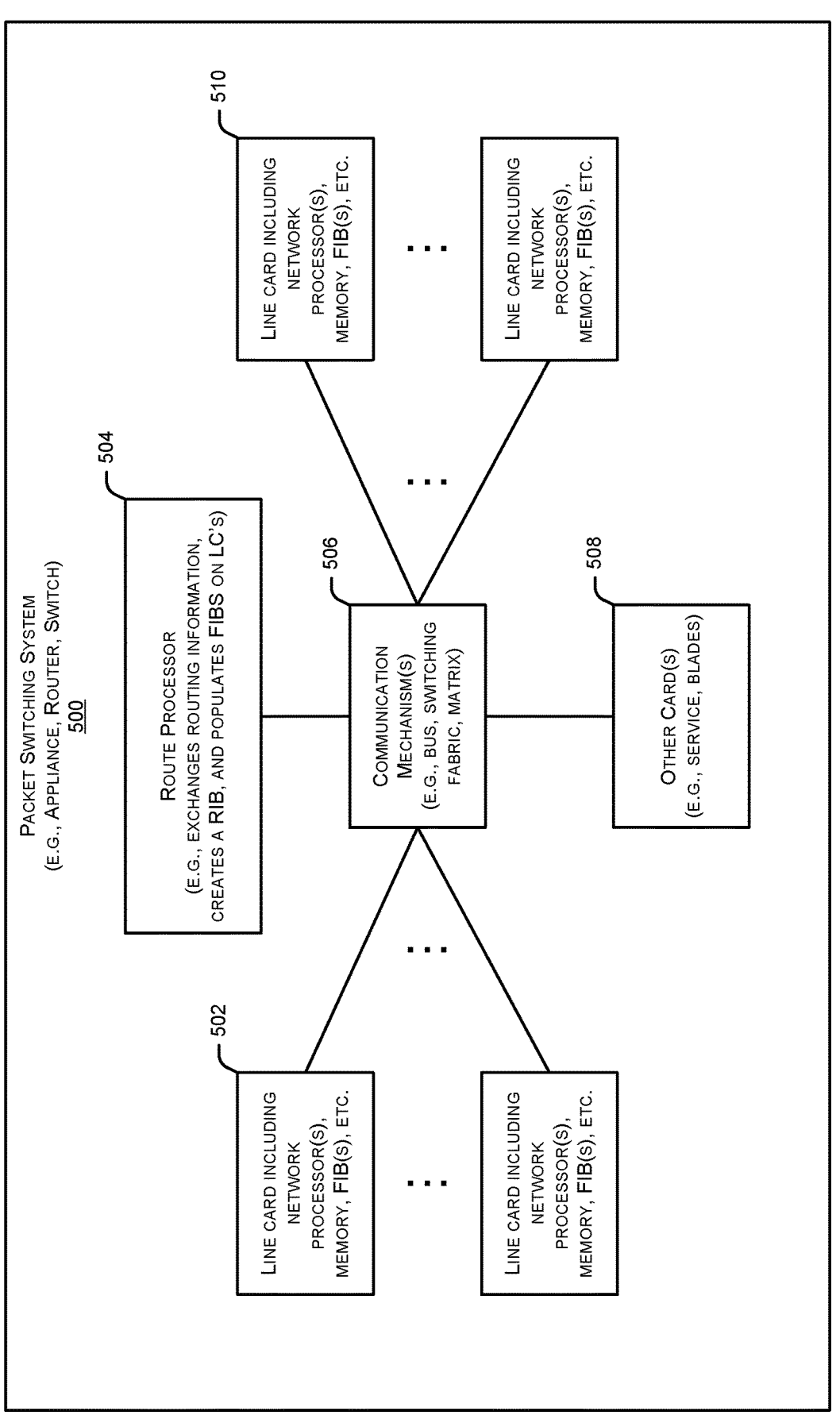
FIG. 5 illustrates a block diagram illustrating an example packet switching device that can be utilized to implement various aspects of the technologies disclosed herein.

FIG. 5 illustrates a block diagram illustrating an example packet switching device 500 that can be utilized to implement various aspects of the technologies disclosed herein. In some examples, packet switching device(s) 500 may be employed in various networks, such as an SDWAN. The packet switching device may, for example, be a branch router or an edge router.

In some examples, a packet switching device 500 may comprise multiple line card(s) 502, 510, each with one or more network interfaces for sending and receiving packets over communications links (e.g., possibly part of a link aggregation group). The packet switching device 500 may also have a control plane with one or more processing elements for managing the control plane and/or control plane processing of packets associated with forwarding of packets in a network. The packet switching device 500 may also include other cards 508 (e.g., service cards, blades) which include processing elements that are used to process (e.g., forward/send, drop, manipulate, change, modify, receive, create, duplicate, apply a service) packets associated with forwarding of packets in a network. The packet switching device 500 may comprise hardware-based communication mechanism 506 (e.g., bus, switching fabric, and/or matrix, etc.) for allowing its different entities (e.g., line card 502, route processor 504, other card(s) 508, and/or line card 510) to communicate. Line card(s) 502, 510 may typically perform the actions of being both an ingress and/or an egress line card 502, 510, in regard to multiple other particular packets and/or packet streams being received by, or sent from, packet switching device 500.

Figure 6:
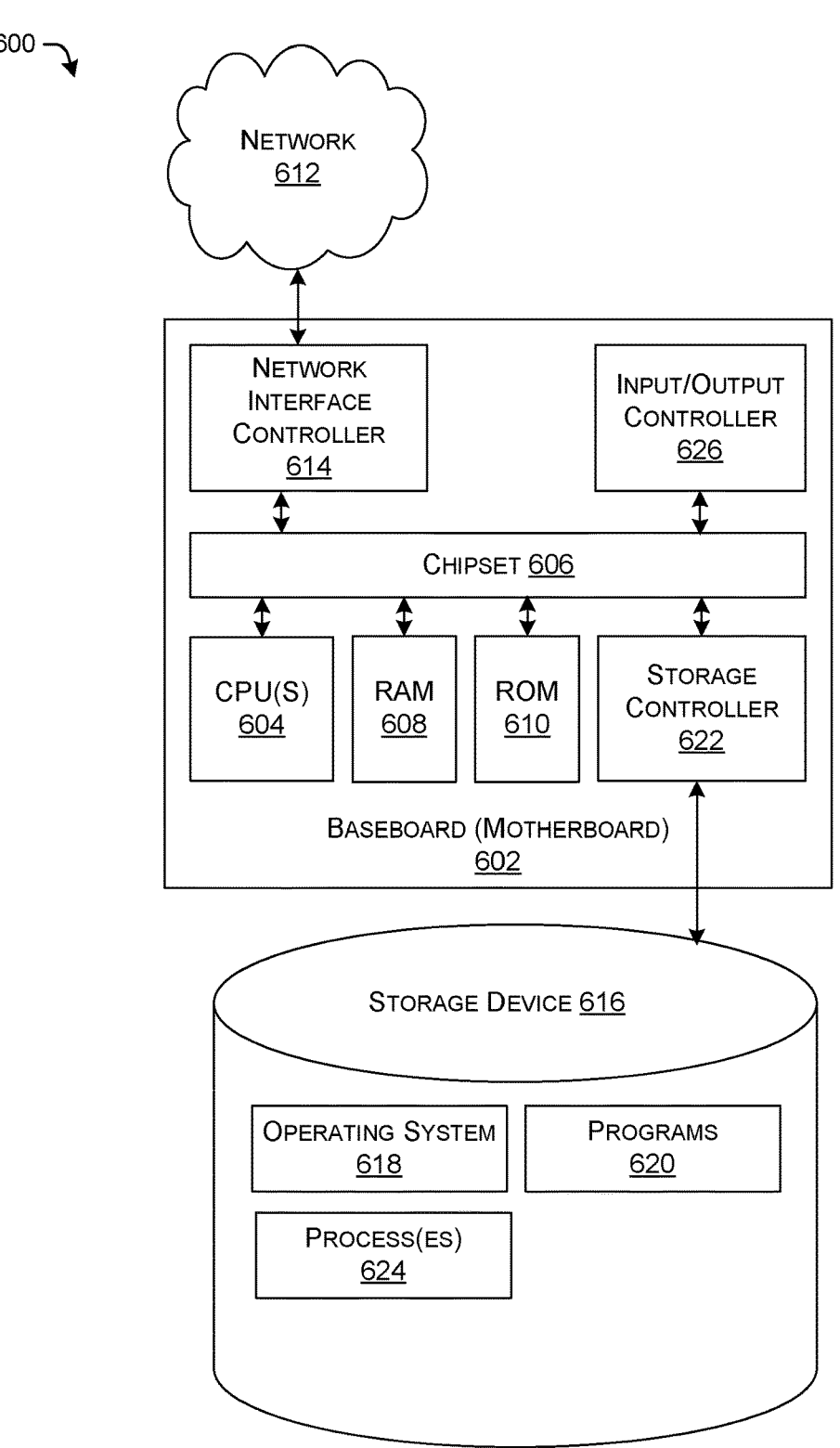
FIG. 6 shows an example computer architecture for a server computer capable of executing program components for implementing the functionality described above.

FIG. 6 shows an example computer architecture for a server computer 600 capable of executing program components for implementing the functionality described above. The computer architecture shown in FIG. 6 illustrates a conventional server computer, workstation, desktop computer, laptop, tablet, network appliance, e-reader, smartphone, or other computing device, and can be utilized to execute any of the software components presented herein. The server computer 600 may, in some examples, correspond to a network node (e.g., the 6) described herein.

The computer 600 includes a baseboard 602, or "motherboard," which is a printed circuit board to which a multitude of components or devices can be connected by way of a system bus or other electrical communication paths. In one illustrative configuration, one or more central processing units ("CPUs") 604 operate in conjunction with a chipset 606. The CPUs 604 can be standard programmable processors that perform arithmetic and logical operations necessary for the operation of the computer 600.

The CPUs 604 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 606 provides an interface between the CPUs 604 and the remainder of the components and devices on the baseboard 602. The chipset 606 can provide an interface to a random-access memory (RAM) 608, used as the main memory in the computer 600. The chipset 606 can further provide an interface to a computer-readable storage medium such as a read-only memory (ROM) 610 or non-volatile RAM (NVRAM) for storing basic routines that help to start up the computer 600 and to transfer information between the various components and devices. The ROM 610 or NVRAM can also store other software components necessary for the operation of the computer 600 in accordance with the configurations described herein.

The computer 600 can operate in a networked environment using logical connections to remote computing devices and computer systems through a network, such as the network 612. The chipset 606 can include functionality for providing network connectivity through a network interface controller (NIC) 614, such as a gigabit Ethernet adapter. The NIC 614 is capable of connecting the computer 600 to other computing devices over the network 612. It should be appreciated that multiple NICs 614 can be present in the computer 600, connecting the computer 600 to other types of networks and remote computer systems. In some instances, the NICs 614 may include at least on ingress port and/or at least one egress port.

The computer 600 can be connected to a storage device 616 that provides non-volatile storage for the computer. The storage device 616 can store an operating system 618, programs 620, and data, which have been described in greater detail herein. The storage device 616 can be connected to the computer 600 through a storage controller 622 connected to the chipset 606. The storage device 616 can consist of one or more physical storage units. A storage controller can interface with the physical storage units through a serial attached small computer system interface (SCSI) (SAS) interface, a serial advanced technology attachment (SATA) interface, a fiber channel (FC) interface, or other type of interface for physically connecting and transferring data between computers and physical storage units.

The computer 600 can store data on the storage device 616 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 616 is characterized as primary or secondary storage, and the like.

For example, the computer 600 can store information to the storage device 616 by issuing instructions through the storage controller 622 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 600 can further read information from the storage device 616 by detecting the physical states or characteristics of one or more particular locations within the physical storage units.

In addition to the mass storage device 616 described above, the computer 600 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 600. In some examples, the operations performed by any network node described herein may be supported by one or more devices similar to computer 600. Stated otherwise, some or all of the operations performed by a network node may be performed by one or more computers 600 operating in a cloud-based arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device 616 can store an operating system 618 utilized to control the operation of the computer 600. According to one embodiment, the operating system comprises the LINUX™ operating system. According to another embodiment, the operating system includes the WINDOWS™ SERVER operating system from MICROSOFT Corporation of Redmond, Washington. According to further embodiments, the operating system can comprise the UNIX™ operating system or one of its variants. It should be appreciated that other operating systems can also be utilized. The storage device 616 can store other system or application programs and data utilized by the computer 600.

In one embodiment, the storage device 616 or other computer-readable storage media is encoded with computer-executable instructions which, when loaded into the computer 600, transform the computer from a general-purpose computing system into a special-purpose computer capable of implementing the embodiments described herein. These computer-executable instructions transform the computer 600 by specifying how the CPUs 604 transition between states, as described above. According to one embodiment, the computer 600 has access to computer-readable storage media storing computer-executable instructions which, when executed by the computer 600, perform the various processes described above with regard to FIGS. 1-6. The computer 600 can also include computer-readable storage media having instructions stored thereupon for performing any of the other computer-implemented operations described herein.

As illustrated in FIG. 6, the storage device 616 stores programs 620, which may include one or more processes 624, as well as 6. The process(es) 624 may include instructions that, when executed by the CPU(s) 604, cause the computer 600 and/or the CPU(s) 604 to perform one or more operations.

The computer 600 can also include at least one input/output controller 626 for receiving and processing input from a number of input devices, such as a keyboard, a mouse, a touchpad, a touch screen, an electronic stylus, or other type of input device. Similarly, an input/output controller 626 can provide output to a display, such as a computer monitor, a flat-panel display, a digital projector, a printer, or other type of output device. It will be appreciated that the computer 600 might not include all of the components shown in FIG. 6, can include other components that are not explicitly shown in FIG. 6, or might utilize an architecture completely different than that shown in FIG. 6.

In some instances, one or more components may be referred to herein as "configured to," "configurable to," "operable/operative to," "adapted/adaptable," "able to," "conformable/conformed to," etc. Those skilled in the art will recognize that such terms (e.g., "configured to") can generally encompass active-state components and/or inactive-state components and/or standby-state components, unless context requires otherwise.

As used herein, the term "based on" can be used synonymously with "based, at least in part, on" and "based at least partly on." As used herein, the terms "comprises/comprising/comprised" and "includes/including/included," and their equivalents, can be used interchangeably. An apparatus, system, or method that "comprises A, B, and C" includes A, B, and C, but also can include other components (e.g., D) as well. That is, the apparatus, system, or method is not limited to components A, B, and C.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A method comprising:
receiving, by a border device associated with a first fabric site and on a transit virtual network (VN) associated with one or more segment VNs, a network packet, wherein:
the network packet includes a payload, is destined for a first subnet associated with the first fabric site, and transmitted from a second subnet associated with a second fabric site, and
the first subnet and the second subnet are associated with a segment VN of the one or more segment VNs;
determining, by the border device, that the network packet is destined for the first subnet;
based on determining that the network packet is destined for the first subnet and by the border device, at least one of retrieving or generating first mapping data, wherein the first mapping data assigns the border device as routing locator for any data packets received on the transit VN and destined for the first subnet associated with the segment VN;
assigning, by the border device, the network packet to the segment VN based on the first mapping data;
based on receiving the network packet on the segment VN and by the border device, at least one of retrieving or generating second mapping data, wherein the second mapping data assigns a first edge device as routing locator for any data packets received on the segment VN and destined for the first subnet; and
routing, by the border device, the network packet to the first edge device.

2. The method of claim 1, wherein:
the one or more segment VNs enable macro-segmentation of a software-defined access network comprising the first subnet and the second subnet.

3. The method of claim 1, further comprising:
receiving, by the border device and on the segment VN, a second network packet, wherein the second network packet includes a second payload transmitted from the first subnet to the second subnet;
determining, by the border device, that the second network packet is destined for the second subnet;
based on determining that the second network packet is destined for the first subnet and by the border device, at least one of retrieving or generating third mapping data, wherein the third mapping data assigns a second border device associated with the second fabric site and on the transit VN as routing locator for any data packets received from the segment VN of the one or more segment VNs and destined for the second subnet; and
routing, by the border device, the second network packet to the second border device and on the transit VN.

4. The method of claim 3, further comprising:
prior to routing the second network packet to the second border device, validating the second network packet using one or more firewall devices, wherein each of the one or more firewall devices is in at least one of: (i) one of the one or more segment VNs, or (ii) the transit VN.

5. The method of claim 4, wherein the one or more firewall devices enable bidirectional validation of network packets associated with the first fabric site.

6. The method of claim 4, wherein the one or more segment VNs comprise multiple segment VNs, and wherein validating the second network packet is based on one or more micro-segmentation policies associated with a software-defined access network comprising a set of subnets associated with the multiple segment VNs.

7. The method of claim 4, wherein the one or more segment VNs comprise multiple segment VNs, and validating the second network packet is based on one or more security group tags (SGTs) associated with a software-defined access network comprising a set of subnets associated with the multiple segment VNs.

8. The method of claim 1, wherein the method includes generating the first mapping data based on:

input data transmitted by a user using a command-line interface associated with at least one of the border device, a network comprising the first fabric site or the second fabric site, or a network controller associated with the network.

9. The method of claim 1, wherein the method includes generating the first mapping data based on:

querying a map server for first routing locator identification data representing the first mapping data.

10. The method of claim 9, wherein the map server determines the first routing locator identification data based on endpoint reporting data reported by one or more endpoint devices.

11. A system comprising:

one or more processors; and one or more computer-readable media storing computer-executable instructions that, when executed by the one or more processors, cause the one or more processors to perform operations comprising:

receiving, by a border device associated with a first fabric site and on a transit virtual network (VN) associated with one or more segment VNs, a network packet, wherein:

the network packet includes a payload, is destined for a first subnet associated with the first fabric site, and transmitted from a second subnet associated with a second fabric site, and the first subnet and the second subnet are associated with a segment VN of the one or more segment VNs;

determining, by the border device, that the network packet is destined for the first subnet;

based on determining that the network packet is destined for the first subnet and by the border device, at least one of retrieving or generating first mapping data, wherein the first mapping data assigns the border device as routing locator for any data packets received on the transit VN and destined for the first subnet associated with the segment VN;

assigning, by the border device, the network packet to the segment VN based on the first mapping data;

based on receiving the network packet on the segment VN and by the border device, at least one of retrieving or generating second mapping data, wherein the second mapping data assigns a first edge device as routing locator for any data packets received on the segment VN and destined for the first subnet; and routing, by the border device, the network packet to the first edge device.

12. The system of claim 11, wherein:

the one or more segment VNs enable macro-segmentation of a software-defined access network comprising the first subnet and the second subnet.

13. The system of claim 11, the operations further comprising:

receiving, by the border device and on the segment VN, a second network packet, wherein the second network packet includes a second payload transmitted from the first subnet to the second subnet;

determining, by the border device, that the second network packet is destined for the second subnet;

based on determining that the second network packet is destined for the first subnet and by the border device, at least one of retrieving or generating third mapping data, wherein the third mapping data assigns a second border device associated with the second fabric site and on the transit VN as routing locator for any data packets received from the segment VN of the one or more segment VNs and destined for the second subnet; and routing, by the border device, the second network packet to the second border device and on the transit VN.

14. The system of claim 13, the operations further comprising:

prior to routing the second network packet to the second border device, validating the second network packet using one or more firewall devices, wherein each of the one or more firewall devices is in at least one of: (i) one of the one or more segment VNs, or (ii) the transit VN.

15. The system of claim 14, wherein the one or more firewall devices enable bidirectional validation of network packets associated with the first fabric site.

16. One or more non-transitory computer-readable media storing computer-executable instructions that, when executed by one or more processors, cause the one or more processors to perform operations comprising:

receiving, by a border device associated with a first fabric site and on a transit virtual network (VN) associated with one or more segment VNs, a network packet, wherein:

the network packet includes a payload, is destined for a first subnet associated with the first fabric site, and transmitted from a second subnet associated with a second fabric site, and the first subnet and the second subnet are associated with a segment VN of the one or more segment VNs;

determining, by the border device, that the network packet is destined for the first subnet;

based on determining that the network packet is destined for the first subnet and by the border device, at least one of retrieving or generating first mapping data, wherein the first mapping data assigns the border device as routing locator for any data packets received on the transit VN and destined for the first subnet associated with the segment VN;

assigning, by the border device, the network packet to the segment VN based on the first mapping data;

based on receiving the network packet on the segment VN and by the border device, at least one of retrieving or generating second mapping data, wherein the second mapping data assigns a first edge device as routing locator for any data packets received on the segment VN and destined for the first subnet; and routing, by the border device, the network packet to the first edge device.

17. The one or more non-transitory computer-readable media of claim 16, wherein:

the one or more segment VNs enable macro-segmentation of a software-defined access network comprising the first subnet and the second subnet.

18. The one or more non-transitory computer-readable media of claim 16, the operations further comprising:

receiving, by the border device and on the segment VN, a second network packet, wherein the second network packet includes a second payload transmitted from the first subnet to the second subnet;

determining, by the border device, that the second network packet is destined for the second subnet;

based on determining that the second network packet is destined for the first subnet and by the border device, at least one of retrieving or generating third mapping data, wherein the third mapping data assigns a second border device associated with the second fabric site and on the transit VN as routing locator for any data packets received from the segment VN of the one or more segment VNs and destined for the second subnet; and routing, by the border device, the second network packet to the second border device and on the transit VN.

19. The one or more non-transitory computer-readable media of claim 18, the operations further comprising:

prior to routing the second network packet to the second border device, validating the second network packet using one or more firewall devices, wherein each of the one or more firewall devices is in at least one of: (i) one of the one or more segment VNs, or (ii) the transit VN.

20. The one or more non-transitory computer-readable media of claim 19, wherein the one or more firewall devices enable bidirectional validation of network packets associated with the first fabric site.

* * * * *